United States Patent
Lee et al.

(10) Patent No.: US 10,011,738 B2
(45) Date of Patent: Jul. 3, 2018

(54) CLEAR PAINT COMPOSITION FOR HOT STAMPING FILM AND PAINTING METHOD USING THE SAME

(71) Applicants: Hyundai Motor Company, Seoul (KR); Kia Motors Corporation, Seoul (KR); CAMS Co., Ltd., Gwangju (KR); NOROO BEE CHEMICAL CO., LTD., Cheonan-si, Chungcheongnam-do (KR)

(72) Inventors: Min Hee Lee, Seoul (KR); Seung Mok Lee, Osan-si (KR); Eun Ju Noh, Changwon-si (KR); Young Seok Kim, Cheonan-si (KR); Yong Chul Lee, Cheonan-si (KR); Kyung Tak Park, Gwangju (KR)

(73) Assignees: Hyundai Motor Company, Seoul (KR); Kia Motors Corporation, Seoul (KR); Cams Co., LTD, Gwangju (KR); Noroo Bee Chemical Co., LTD, Cheonan-si (KR)

( * ) Notice: Subject to any disclaimer, the term of this patent is extended or adjusted under 35 U.S.C. 154(b) by 140 days.

(21) Appl. No.: 14/963,004

(22) Filed: Dec. 8, 2015

(65) Prior Publication Data
US 2017/0096580 A1  Apr. 6, 2017

(30) Foreign Application Priority Data

Oct. 5, 2015 (KR) ........................ 10-2015-0139716

(51) Int. Cl.
| | | |
|---|---|---|
| *C09D 175/06* | (2006.01) | |
| *C09D 7/48* | (2018.01) | |
| *B05D 7/00* | (2006.01) | |
| *C08F 220/18* | (2006.01) | |
| *C08F 220/28* | (2006.01) | |
| *C08F 220/32* | (2006.01) | |
| *C08G 18/24* | (2006.01) | |
| *C08G 18/40* | (2006.01) | |
| *C08G 18/71* | (2006.01) | |
| *C08G 18/73* | (2006.01) | |
| *C09D 5/00* | (2006.01) | |
| *C09D 7/12* | (2006.01) | |
| *C09D 133/06* | (2006.01) | |
| *C09D 163/00* | (2006.01) | |

(52) U.S. Cl.
CPC ............ *C09D 175/06* (2013.01); *B05D 7/53* (2013.01); *C08F 220/18* (2013.01); *C08F 220/28* (2013.01); *C08F 220/32* (2013.01); *C08G 18/246* (2013.01); *C08G 18/4063* (2013.01); *C08G 18/718* (2013.01); *C08G 18/73* (2013.01); *C09D 5/00* (2013.01); *C09D 7/1241* (2013.01); *C09D 7/48* (2018.01); *C09D 133/068* (2013.01); *C09D 163/00* (2013.01); *C08F 2220/1825* (2013.01); *C08F 2220/281* (2013.01); *C08F 2220/325* (2013.01)

(58) Field of Classification Search
CPC ..................................................... C08L 33/068
See application file for complete search history.

(56) References Cited

U.S. PATENT DOCUMENTS

2015/0005406 A1    1/2015  Ooga et al.

FOREIGN PATENT DOCUMENTS

| EP | 0 267 554 A2 | 5/1988 |
|---|---|---|
| EP | 0 492 562 A2 | 7/1992 |
| JP | 2001064573 A | 3/2001 |
| JP | 2006-348072 | 12/2006 |
| KR | 1019950018336 | 7/1995 |
| KR | 10-2001-0096300 | 11/2001 |
| KR | 20040095882 A | 11/2004 |
| KR | 10-2006-0097980 | 9/2006 |
| KR | 1020120032263 | * 4/2012 |
| KR | 10-1230890 | 2/2013 |
| KR | 20130078644 A | 7/2013 |
| WO | 2007/020269 A1 | 2/2007 |

OTHER PUBLICATIONS

KR 1020120032263 translation (2012).*
European Patent Office, Munich, Germany, Extended European Search Report dated Apr. 7, 2017, 4 pages.
"Spectral and Chemical Determination of Copolymer Composition of Poly (Butyl Acrylate-Co-Glycidyl Methacrylate) from Emulsion Polymerization," by H. Bakhshi et al., Polymer Testing, vol. 28, 2009, pp. 730-736.
Database WPI, Week 200151, Thomson Scientific, London, GB, AN 2001-467621, XP002768644.

* cited by examiner

*Primary Examiner* — Kuo Liang Peng
(74) *Attorney, Agent, or Firm* — Brinks Gilson & Lione (57) ABSTRACT

A clear paint composition for a hot stamping film and a painting method using the same is provided. More particularly, disclosed are a clear paint composition for a hot stamping film which may enhance adhesion by mixing an epoxy-denatured acrylic resin and two light absorber types with an acrylic resin and a polyester polyol resin, may increase weather resistance by simultaneously blocking short and long wavelengths and may enhance chipping resistance, fouling resistance and water resistance by mixing a hardener including reactive silicone therewith, and a painting method using the same.

16 Claims, 2 Drawing Sheets

CLEAR PAINT COMPOSITION FOR HOT STAMPING FILM AND PAINTING METHOD USING THE SAME

CROSS-REFERENCE TO RELATED APPLICATIONS

This application claims the benefit of and priority to Korean Patent Application No. 10-2015-0139716, filed on Oct. 5, 2015, the contents of which are incorporated herein by reference in its entirety.

FIELD

The present disclosure relates to a clear paint composition for a hot stamping film and a painting method using the same. More particularly, it relates to a clear paint composition for a hot stamping film which may enhance adhesion, increase weather resistance, and enhance chipping resistance, fouling resistance and water resistance.

BACKGROUND

The statements in this section merely provide background information related to the present disclosure and may not constitute prior art.

Plating is generally performed to accomplish surface hardening or high-quality decorative plating design for preventing corrosion (corrosion resistance) of some products among vehicle injection members applied to interior or exterior decor of vehicles such as cars or vans.

Recently, a method of forming a hot stamping film composed of acrylonitrile-styrene-acrylate (ASA), using a hot stamping film transfer method, is used to accomplish high-quality decorative plating of exterior components for vehicles.

However, it is difficult to secure durability such as water resistance, chipping resistance and weather resistance using only an ASA film upon a hot stamping process. In addition, adhesion of a film and paint is remarkably reduced, compared to conventional ABS resins, and weather resistance is also poor.

SUMMARY

The present disclosure provides a clear paint composition for a hot stamping film having enhanced water resistance, chipping resistance and fouling resistance. Adhesion may be enhanced by mixing an epoxy-denatured acrylic resin and two light absorber types with an acrylic resin and a polyester polyol resin. Weather resistance may be increased by simultaneously blocking short and long wavelengths. Chipping resistance, fouling resistance and water resistance may be enhanced by mixing a hardener including reactive silicone therewith, thereby completing the present disclosure.

In another form of the present disclosure, a method of painting is provided using a paint composition for a hot stamping film, including a primer layer and a clear layer which protect the hot stamping film and, at the same time, have enhanced durability.

In yet another form of the present disclosure, an epoxy-denatured acrylic resin is provided that has a repeated unit structure represented by Formula 1 below:

[Formula 1]

wherein K, L, M, N and O are relative ratios of each repeated unit thereof and K+L+M+N+O=1; a repeated methyl methacrylate unit K is 0.2 to 0.6; a repeated epoxy acrylate unit L is 0.1 to 0.25; a repeated methyl methacrylate unit M is 0.1 to 0.2; a repeated butyl methacrylate unit N is 0.1 to 0.15; and a repeated 2-hydroxyethyl methacrylate unit O is 0.1 to 0.2.

In yet another form, the present disclosure provides a clear paint composition for a hot stamping film including: a main material part including an epoxy-denatured acrylic resin, an acrylic resin, a polyester polyol, a reactive catalyst, a wet additive, a light stabilizer and a solvent; and a hardener part including a hexamethylene diisocyanate trimer-based hardener and a reactive silicone hardener.

In still another form, the present disclosure provides a method of painting using a clear paint composition for a hot stamping film, the method including: forming a primer layer by spreading, on a painting subject, a primer paint composition including an epoxy-denatured acrylic resin, an acrylic resin, a polyester polyol, a reactive catalyst, a wet additive, a light stabilizer and a solvent; and forming a clear layer by spreading the clear paint composition on the primer layer.

In still another aspect, the present disclosure provides an epoxy-denatured acrylic resin having a repeated unit structure represented by Formula 1.

wherein K, L, M, N and O are relative ratios of each repeated unit thereof and K+L+M+N+O=1; a repeated methyl methacrylate unit K is 0.2 to 0.6; a repeated epoxy acrylate unit L is 0.1 to 0.25; a repeated methyl methacrylate unit M is 0.1 to 0.2; a repeated butyl methacrylate unit N is 0.1 to 0.15; and a repeated 2-hydroxyethyl methacrylate unit O is 0.1 to 0.2.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will now be made in detail to various forms of the present disclosure, examples of which are illustrated and described below. While the present disclosure will be described in conjunction with various forms, it will be understood that present description is not intended to limit the disclosure to those forms. On the contrary, the present disclosure is intended to cover not only the various forms described, but also various alternatives, modifications, equivalents and other forms, which may be included within the spirit and scope of the disclosure as defined by the appended claims.

The present disclosure provides a clear paint composition for a hot stamping film including: a main material part including an epoxy-denatured acrylic resin, an acrylic resin, a polyester polyol, a reactive catalyst, a wet additive, a light stabilizer and a solvent; and a hardener part including a hexamethylene diisocyanate trimer-based hardener and a reactive silicone hardener.

In one form of the present disclosure, the main material part may include 50 to 60% by weight of the epoxy-denatured acrylic resin, 10 to 15% by weight of the acrylic resin, 5 to 10% by weight of polyester polyol, 0.1 to 1.5% by weight of the reactive catalyst, 0.1 to 1% by weight of the wet additive, 1 to 2% by weight of the light stabilizer, and 20 to 30% by weight of the solvent.

In another form of the present disclosure, the main material part and the hardener part may be mixed in a weight ratio of 2.0:1 to 4.0:1. In particular, a mixing ratio of the main material part to the hardener part is outside the range, hardening is not performed and a film is not satisfactorily formed. In addition, although a film is formed, it is difficult to secure required properties. The paint composition according to the present disclosure is prepared by mixing the main material part and the hardener part, and then, painting and hardening the same, thereby forming a transparent film.

In another form of the present disclosure, the epoxy-denatured acrylic resin may have an acid value of 3 to 10 mg/KOH, a hydroxyl content of 1 to 5% and a weight-average molecular weight (Mw) of 8,000 to 20,000. In order to minimize stickiness of a film, the epoxy-denatured acrylic resin may have a glass transition temperature of 60 to 70° C. and a solid content of 50% or more and may be mixed in an amount of 50 to 60% by weight, thereby enhancing reliability, as well as adhesion and water resistance of a film. When the content is less than 50% by weight, it is difficult to realize reliability of a film. When the content is greater than 60% by weight, adhesion and water resistance may be decreased.

Figure 1:
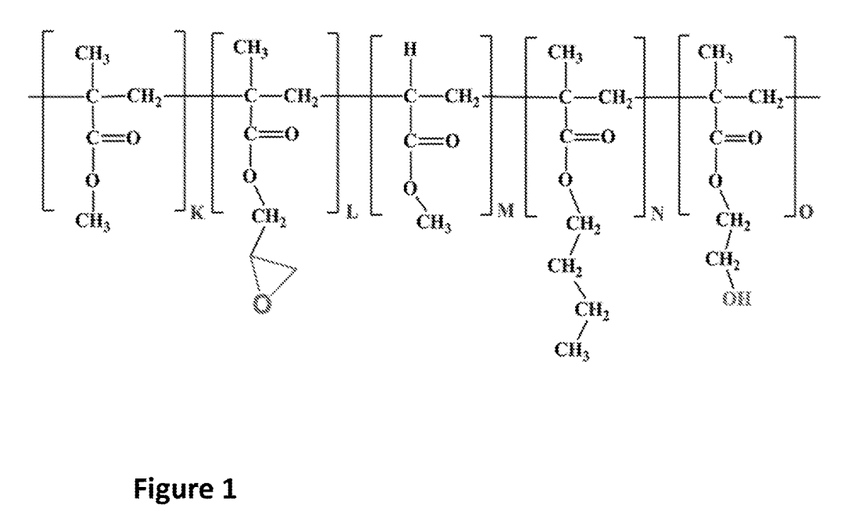
FIG. 1 is a chemical description of Formula 1.

In yet another form of the present disclosure, the epoxy-denatured acrylic resin may be an epoxy-denatured acrylic resin having a repeated unit structure represented by Formula 1 below (see also FIG. 1):

[Formula 1]

wherein K, L, M, N and O are relative ratios of each repeated unit thereof and K+L+M+N+O=1; a repeated methyl methacrylate unit K is 0.2 to 0.6; a repeated epoxy acrylate unit L is 0.1 to 0.25; a repeated methyl methacrylate unit M is 0.1 to 0.2; a repeated butyl methacrylate unit N is 0.1 to 0.15; and a repeated 2-hydroxyethyl methacrylate unit O is 0.1 to 0.2.

In another form of the present disclosure, the acrylic resin may have an acid value of 0.01 to 0.05 mg/KOH, a hydroxyl content of 0.1 to 0.5% and a weight-average molecular weight (Mw) of 9,000 to 15,000. The acrylic resin may have a glass transition temperature of 70 to 80° C. and a solid content of 50% or more and may be used in an amount of 10 to 15% by weight, thereby providing hardness to a paint film and enhancing chipping characteristics. When the content is less than 10% by weight, chipping characteristics to a material may be decreased. When the content is greater than 15% by weight, painting workability (leveling) may be reduced.

In another form of the present disclosure, the acrylic resin may be prepared by radical-polymerizing various monomers having double bonds such as acrylic or vinyl-based monomers in a solution, with a thermal decomposition initiator. Examples of the acrylic or vinyl-based monomers include nonfunctional monomers, carboxyl monomers, hydroxyl monomers, and vinyl monomers, among others.

Examples of the nonfunctional monomer include methylacrylate, ethylacrylate, isopropylacrylate, N-butylacrylate, ethylhexyl acrylate, methyl methacrylate, ethyl methacrylate, butyl methacrylate, hexyl methacrylate, lauryl methacrylate, among others. Examples of the carboxyl monomer include, but are not limited to, acrylic acid, methacrylic acid, maleic acid, itaconic acid, crotonic acid, etc. Particular examples of the hydroxyl monomer include 2-hydroxymethacrylate, hydroxypropylacrylate, 4-hydroxybutylacrylate and 2-hydroxyethylacrylate, etc. Particular examples of the vinyl monomer include acrylamide, N-methylolacrylamide, glycidylmethacrylate, styrene, vinyltoluene, acrylonitrile, vinylacetate.

In the present disclosure, glycidylmethacrylate as an acrylic resin may be used to synthesize the epoxy-denatured acrylic resin. Here, glycidylmethacrylate has an epoxy group, thereby having excellent hardness and chemical resistance, compared to other monomers having the same glass transition temperature (Tg). In addition, glycidylmethacrylate has excellent adhesion and thus adhesion to poorly adhesive materials may be enhanced.

In yet another form of the present disclosure, polyester polyol may have a hydroxyl content of 2 to 4%, a weight-average molecular weight (Mw) of 3,000 to 10,000 and a solid content of 80% by weight. Polyester polyol is cross-linked with isocyanate as a hardener and thus water resistance may be compensated. In addition, polyester polyol may be used in an amount of 5 to 10% by weight. When the content is less than 5% by weight, water resistance effects may be decreased. When the content is greater than 10% by weight, the hardness of a paint film may be decreased and surface may become sticky.

In still another form of the present disclosure, polyester polyol may be prepared according to the following method. First, acidic ingredients, polyhydric alcohol ingredients, a catalyst, and various additives are input to a reactor equipped with a stirrer. Ester condensation by-products having low molecular weight are removed to the outside while maintaining reactor temperature at 200 to 230° C., and, at the same time, esterification is performed. The reaction is generally terminated when a transition rate of esterification is 95% or more of a theoretical outflow amount of low-molecular-weight ester by-products. When the esterification is terminated, polyester condensation reaction is induced while increasing the reactor temperature to 250 to 280° C. Such condensation reaction is stopped when an acid value is 2 to 4 mg KOH/g or less, thereby preparing a polyester polyol resin as a reaction product.

In another form of the present disclosure, the reactive catalyst may be dibutyl tin dilaurate. The reactive catalyst enhances reaction rates of the main material (i.e., hydroxyl group) and the hardener (i.e., isocyanate), and may be used in an amount of 0.1 to 1.5% by weight. When the content is less than 0.1% by weight, reaction rates of the main material and the hardener may be decreased. When the content is greater than 1.5% by weight, pot life is decreased and thus workability may be deteriorated.

In another form of the present disclosure, the wet additive may be a polydimethyl siloxane-based material. The wet additive may enhance wettability and leveling characteristics of a paint film during painting.

In another form of the present disclosure, the light stabilizer may be two or more selected from the group consisting of benzophenones, oxanilides, benzotriazoles, triazines, 4-benzoyloxy-2,2,6,6-tetramethylpiperidine and 2,4-di-tert-butylphenyl-3,5-di-tert-butyl-benzoate. In particular, as the light stabilizer, Tinuvin 292 as a light stabilizer (Hindered Amine Light Stabilizer, HALS), and Tinuvin 1130 and Tinuvin 479 as a light absorber (UV Absorber) may be used. A mixture of the light stabilizer and the light absorber may be used. Tinuvin 479 is an example of a light absorber that absorbs a long UV wavelength band, and, when applied to a glossy one-layer clear paint system, securing weather resistance is greatly affected. Tinuvin 479 may be used in an amount of 0.1 to 0.5% by weight based on a total weight. Such a light stabilizer simultaneously blocks short and long wavelengths, thereby enhancing weather resistance.

In another form of the present disclosure, the solvent may be an ester-based material, a hydrocarbon-based material or a mixture thereof. The solvent facilitates painting work and, by controlling volatilization speed of a solvent, smoothness and appearance of a paint film may be secured. In addition, the content of the solvent may be changed depending upon required paint film thickness and paint film formation method, but, particularly, may be 20 to 30% by weight based on a total weight. Through such solvent content control, the viscosity of paint is preferably adjusted to about 13.0 to 15.0 sec (Ford Cup #4) to perform painting.

In another form of the present disclosure, the hardener part may include 90 to 99% by weight of the hexamethylene diisocyanate trimer-based hardener and 1 to 10% by weight of the reactive silicone hardener. When the content of the reactive silicone hardener is less than 1% by weight, chipping resistance and fouling resistance may be decreased. When the content is greater than 10% by weight, sufficient hardening might not occur. The reactive silicone hardener may be included in an amount of particularly 1 to 5% by weight, more particularly 3% by weight. In addition, the hexamethylene diisocyanate trimer-based hardener exhibits unfading characteristics and superior weather resistance.

Figure 2:
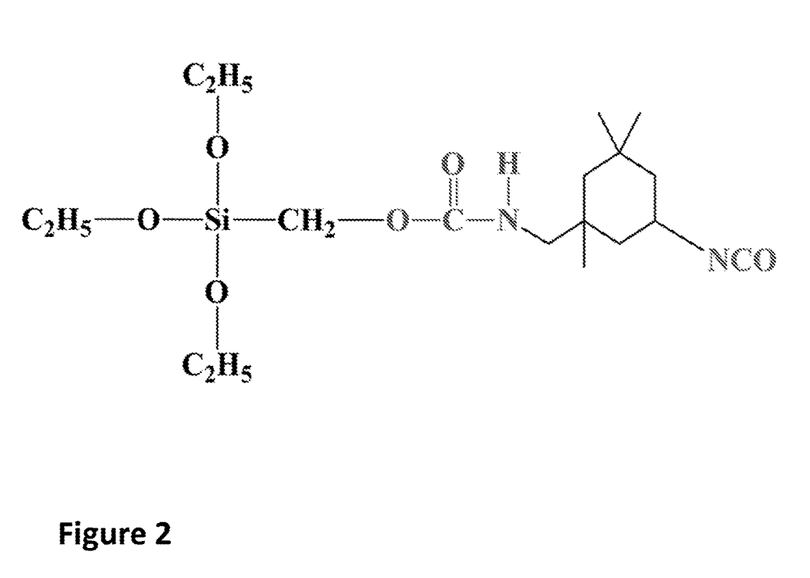
FIG. 2 is a chemical description of Formula 2.

In another form of the present disclosure, the reactive silicone hardener is prepared by synthesizing triethoxysilane with isophorone diisocyanate (IPDI) to realize chipping resistance and fouling resistance. Here, an isocyanate group may be included in an amount of 0.1 to 1% by weight with respect to silicon (Si). When the content of the isocyanate group is less than 0.1% by weight, it is difficult to anticipate fouling resistance effects. When the content is greater than 1% by weight, compatibility is poor, upon paint mixing, due to strong hydrophobic properties. The isocyanate group may be particularly included in an amount of 0.1 to 0.2% by weight. Such reactive silicone hardener may be represented by Formula 2 below (see also FIG. 2):

[Formula 2]

In addition, the present disclosure provides a method of painting using a clear paint composition for a hot stamping film, the method including forming a primer layer by spreading, on a painting subject, a primer paint composition including an epoxy-denatured acrylic resin, an acrylic resin, a polyester polyol, a reactive catalyst, a wet additive, a light stabilizer and a solvent; and forming a clear layer by spreading the clear paint composition on the primer layer.

In one form of the present disclosure, the primer paint composition may include 50 to 60% by weight of the epoxy-denatured acrylic resin, 10 to 15% by weight of the acrylic resin, 5 to 10% by weight of polyester polyol, 0.1 to 1.5% by weight of the reactive catalyst, 0.1 to 1% by weight of the wet additive, 1 to 2% by weight of the light stabilizer, and 20 to 30% by weight of the solvent.

In another form of the present disclosure, the painting subject may be a polymer film formed through hot stamping. The polymer film may be a hot stamping film layer composed of acrylonitrile-styrene-acrylate (ASA).

The painting method may enhance adhesion to a painting subject by forming a primer layer on a painting subject through first-painting using the primer paint composition and performing two-step coating of forming a clear layer on the primer layer, thereby greatly enhancing high-pressure washing resistance.

The present disclosure also provides an epoxy-denatured acrylic resin having a repeated unit structure represented by Formula 1 below:

[Formula 1]

wherein K, L, M, N and O are relative ratios of each repeated unit thereof and K+L+M+N+O=1; a repeated methyl methacrylate unit K is 0.2 to 0.6; a repeated epoxy acrylate unit L is 0.1 to 0.25; a repeated methyl methacrylate unit M is 0.1 to 0.2; a repeated butyl methacrylate unit N is 0.1 to 0.15; and a repeated 2-hydroxyethyl methacrylate unit O is 0.1 to 0.2.

Accordingly, the clear paint composition for a hot stamping film according to the present disclosure may enhance adhesion by mixing an epoxy-denatured acrylic resin and two light absorber types with an acrylic resin and a polyester polyol resin, and may increase weather resistance by simultaneously blocking short and long wavelengths. In addition, when a hardener including reactive silicone is mixed therewith, chipping resistance, fouling resistance and water resistance may be enhanced.

In addition, when a method of painting and coating twice on a film is used instead of a conventional method of using only a hot stamping film, a film may be protected and durability secured. In addition, production costs may be reduced compared to conventional plating and masking a paint film.

The following examples illustrate the teachings of the present disclosure and are not intended to limit the same.

EXAMPLES 1 to 4 AND COMPARATIVE EXAMPLES 1 to 10

Using ingredients and composition ratios summarized in Table 1 below, clear paints for hot stamping films are prepared. Using each of the clear paints, a hot stamping film painted and coated twice is prepared. In particular, the clear paint is prepared by using butyl acetate as a solvent after mixing a main material part and a hardener part in a weight ratio of 3:1 and then painting and hardening are performed at a paint viscosity of 15 sec (Ford Cup #4).

In addition, in order to double-coat the hot stamping film, painting is performed after hot-stamping (forming a stamping layer) an injected ASA material. First, in order to remove foreign materials of the stamped material, pre-treatment (electrostatic blower) is performed. Subsequently, each of primer paint compositions prepared according to ingredient content ratios as summarized in Table 2 below is spread on the hot-stamped film layer and stood at room temperature for five minutes, thereby forming a primer layer (10 to 15 μm). Subsequently, a clear paint (25 to 3515 μm) is spread thereon. Subsequently, hardening is performed for 30 minutes at 80° C., thereby preparing a coated two-layer hot stamping film.

TABLE 1

| Classification (% by weight) | | Examples | | Comparative Examples | | | | | |
|---|---|---|---|---|---|---|---|---|---|
| | | 1 | 2 | 1 | 2 | 3 | 4 | 5 | 6 |
| Main material part | Epoxy-denatured acrylic resin | 50 | 60 | — | — | 55 | 60 | 65 | 50 |
| | Acrylic resin | 15 | 10 | — | 60 | 20 | — | 10 | 15 |
| | Polyester polyol | 10 | 5 | — | 15 | — | 15 | — | 10 |
| | Reactive catalyst | 0.4 | 0.4 | — | 0.4 | 0.4 | 0.4 | 0.4 | 0.4 |
| | Wet additive | 0.3 | 0.3 | — | 0.3 | 0.3 | 0.3 | 0.3 | 0.3 |
| | Light stabilizer | 0.3 | 0.3 | — | 0.3 | 0.3 | 0.3 | 0.3 | 0.3 |
| | Solvent | 24 | 24 | — | 24 | 24 | 24 | 24 | 24 |
| Hardener | Hexamethylene diisocyanate trimer-based material | 97 | 97 | — | — | — | — | — | — |
| | Reactive silicone | 3 | 3 | — | — | — | — | — | — |

TABLE 2

| Classification (% by weight) | | | Examples | | Comparative Examples | | | |
|---|---|---|---|---|---|---|---|---|
| | | | 3 | 4 | 7 | 8 | 9 | 10 |
| Primer layer | Basic material | Epoxy-denatured acrylic resin | 50 | 50 | 55 | 60 | 65 | 50 |
| | | Acrylic resin | 15 | 15 | 20 | — | 10 | 15 |
| | | Polyester polyol | 10 | 10 | — | 15 | — | 10 |

TABLE 2-continued

|  |  |  | Examples | | Comparative Examples | | | |
|---|---|---|---|---|---|---|---|---|
| Classification (% by weight) | | | 3 | 4 | 7 | 8 | 9 | 10 |
| | | Reactive catalyst | 0.4 | 0.4 | 0.4 | 0.4 | 0.4 | 0.4 |
| | | Wet additive | 0.3 | 0.3 | 0.3 | 0.3 | 0.3 | 0.3 |
| | | Light stabilizer | 0.3 | 0.3 | 0.3 | 0.3 | 0.3 | 0.3 |
| | | Solvent | 24 | 24 | 24 | 24 | 24 | 24 |
| Clear layer | Main material part | Epoxy-denatured acrylic resin | 60 | 50 | 55 | 60 | 65 | 50 |
| | | Acrylic resin | 10 | 15 | 20 | — | 10 | 15 |
| | | Polyester polyol | 5 | 10 | — | 15 | — | 10 |
| | | Reactive catalyst | 0.4 | 0.4 | 0.4 | 0.4 | 0.4 | 0.4 |
| | | Wet additive | 0.3 | 0.3 | 0.3 | 0.3 | 0.3 | 0.3 |
| | | Light stabilizer | 0.3 | 0.3 | 0.3 | 0.3 | 0.3 | 0.3 |
| | | Solvent | 24 | 24 | 24 | 24 | 24 | 24 |
| | Hardener | Hexamethylene diisocyanate trimer-based material | 97 | 97 | — | — | — | — |
| | | Reactive silicone | 3 | 3 | — | — | — | — |

[Used Ingredients]

1) Epoxy-denatured acrylic resin: Has a weight-average molecular weight (Mw) of 8,000 to 20,000, a hydroxyl content of 1 to 5%, a glass transition temperature of 60 to 70° C., and an acid value of 3 to 10 mg/KOH.

2) Acrylic resin: Has a weight-average molecular weight (Mw) of 9,000 to 15,000, a hydroxyl content of 0.1 to 0.5%, a glass transition temperature of 70 to 80° C., and an acid value of 0.01 to 0.05 mg/KOH.

3) Polyester polyol: Has a weight-average molecular weight (Mw) of 3,000 to 10,000 and a hydroxyl content of 2 to 4%.

4) Reactive silicone hardener: Has a solid content (N.V) of 10% or less and an isocyanate group content of 0.1 to 0.2%.

5) Wet additive: Polydimethyl siloxane-based material

6) Light stabilizer: Tinuvin 1130(UVA) and Tinuvin 292 (HALS)

7) Solvent: Butyl acetate

8) Hardener: Is a mixture including 97% by weight of a hexamethylene diisocyanate trimer-based hardener and 3% by weight of the reactive silicone hardener.

Experimental Example

In order to measure properties of the paint prepared according to each of Examples 1 to 4 and Comparative Examples 1 to 10, a paint film specimen was prepared through painting and hardening, and properties thereof were measured as follows. Results are summarized in Tables 3 and 4 below.

[Experimental Method]

1) Washing Resistance:

Initial gloss of the paint film specimen was measured (60 degree). In addition, the specimen was installed in a test board. A regulated DUST solution was stirred, and then, while continuously spraying the solution thereto, a brush composed of polystyrene was moved 10 cycles back and forth thereon at a rate of 5 m/min. After testing, the specimen was cleaned using soapy water and stood at room temperature. Subsequently, foreign materials on a surface thereof was removed using an organic detergent. Final gloss of the specimen was measured, and gloss maintenance ratios before and after automatic washing were calculated.

2) Chipping Resistance:

Tests were performed using 50 g of regulated gravels (JIS Crushed gravel No 7 stone, 2.5 to 5 mm, 350 to 400 stones) and a gravel chipping tester (GRAVELO METER: standardized product SAF J 400) under conditions of a launch distance of 100 mm), a launch angle of 45° and a launch pressure of 5.0 Kgf/cm$^2$.

3) Water Resistance:

A test piece was soaked in a 50±2° C. water bath for 240 hours, and then, appearance evaluation and an initial adhesion test were performed.

4) Fouling Resistance/Contact Angle:

A regulated pollution test solution (mixture of KS A0090 and DIW mixed in ratio of 1:1) was spread on a paint film and then stood for 24 hours. Subsequently, the test piece was washed with a high-pressure washer, and then, ease of pollution removal was evaluated with the naked eye (1 to 5 grades).

TABLE 3

| | Examples | | Comparative Examples | | | | | |
|---|---|---|---|---|---|---|---|---|
| Classification | 1 | 2 | 1 | 2 | 3 | 4 | 5 | 6 |
| High-pressure-washing resistance (bar) | 70 | 90 | 120 | 70 or less | 70 or less | 90 | 90 | 70 |
| Chipping resistance | Satisfactory | Satisfactory | N.G. | N.G. | Satisfactory | N.G. | Satisfactory | Satisfactory |

TABLE 3-continued

|  | Examples | | Comparative Examples | | | | | |
|---|---|---|---|---|---|---|---|---|
| Classification | 1 | 2 | 1 | 2 | 3 | 4 | 5 | 6 |
| Water resistance | Satisfactory | Satisfactory | N.G | N.G | N.G | Satisfactory | N.G | N.G |
| Fouling resistance/ contact angle | 4 grade/ 102° | 4.5 grade/ 104° | 2 grade/ 80° | 2 grade/ 85° | 2 grade/ 87° | 2 grade/ 87° | 3 grade/ 92° | 2 grade/ 85° |

As shown in Table 3, it can be confirmed that, in the case of Comparative Example 1 in which painting is not performed and only the ASA film is present, deficient properties are observed in all evaluated items such as chipping resistance, water resistance and fouling resistance.

In addition, it can be confirmed that, in the cases of Comparative Examples 2 to 5 in which a hardener is not used, adhesion is increased with increasing epoxy-denatured acrylic resin content in a resin and thus high-pressure-washing resistance is enhanced, but, in a certain content or more, the content of polyester polyol is decreased and thus water resistance is decreased.

On the other hand, we found that, in the cases of Examples 1 and 2 in which the epoxy-denatured acrylic resin, the acrylic resin and polyester polyol are included in a predetermined ratio and the hardener including the reactive silicone hardener is used, high-pressure-washing resistance, chipping resistance and durability are satisfied and, at the same time, fouling resistance and a contact angle to water is greater.

are superior and, at the same time, adhesion to the hot stamping film layer is enhanced and, particularly, high-pressure washing resistance is enhanced.

As described above, the clear paint composition according to the present disclosure may enhance adhesion by mixing the epoxy-denatured acrylic resin and the two light absorber types with the acrylic resin and a polyester polyol resin and may enhance weather resistance by simultaneously blocking short and long wavelengths. In addition, chipping resistance, fouling resistance and water resistance may be enhanced by mixing the hardener including the reactive silicone.

The clear paint composition for a hot stamping film according to the present disclosure may enhance adhesion by mixing an epoxy-denatured acrylic resin and two light absorber types with an acrylic resin and a polyester polyol resin, and may increase weather resistance by simultaneously blocking short and long wavelengths.

TABLE 4

|  | Examples | | Comparative Examples | | | |
|---|---|---|---|---|---|---|
| Classification | 3 | 4 | 7 | 8 | 9 | 10 |
| High-pressure-washing resistance (bar) | 100 | 120 | 90 | 100 | 100 | 100 |
| Chipping resistance | Satisfactory | Satisfactory | Satisfactory | N.G | Satisfactory | Satisfactory |
| Water resistance | Satisfactory | Satisfactory | N.G | Satisfactory | N.G | Satisfactory |
| Fouling resistance/ contact angle | 4.5 grade/ 102° | 4.5 grade/ 102° | 3 grade/ 92° | 3 grade/ 90° | 3 grade/ 92° | 3 grade/ 90° |

As shown in Table 4, it can be confirmed that, in the cases of Examples 7 to 10 in which the compositions of the clear layers are the same as those of Comparative Examples 1 to 6 and the primer layer is additionally used, adhesion is enhanced and, particularly, high-pressure washing resistance and fouling resistance/contact angle are enhanced, compared to Comparative Examples 1 to 6 in which the primer layer is not used. However, it can be confirmed that chipping resistance and water resistance are still not good.

On the other hand, it can be confirmed that, in the cases of Examples 3 and 4 to which the primer layer was additionally applied as described above, durability such as chipping resistance, water resistance and fouling resistance In addition, chipping resistance, fouling resistance and water resistance may be enhanced by addition of a hardener including reactive silicone.

In addition, by using the method of coating a paint film twice on a film instead of a conventional method wherein only a hot stamping film is applied, the film may be protected and durability may be secured. At the same time, manufacturing costs may be saved, compared to conventional plated and masked paint films.

The present disclosure has been described in detail with reference to various forms thereof. However, it will be appreciated by those skilled in the art that changes may be made in the various forms without departing from the principles and spirit of the present disclosure, the scope of which is defined in the appended claims and their equivalents.

What is claimed is:

1. A clear paint composition for a hot stamping film comprising:
a main material part comprising an epoxy-denatured acrylic resin, an acrylic resin, a polyester polyol, a reactive catalyst, a wet additive, a light stabilizer and a solvent; and
a hardener part comprising a hexamethylene diisocyanate trimer-based hardener and a reactive silicone hardener.

2. The clear paint composition according to claim 1, wherein the main material part comprises 50 to 60% by weight of the epoxy-denatured acrylic resin, 10 to 15% by weight of the acrylic resin, 5 to 10% by weight of polyester polyol, 0.1 to 1.5% by weight of the reactive catalyst, 0.1 to 1% by weight of the wet additive, 1 to 2% by weight of the light stabilizer and 20 to 30% by weight of the solvent.

3. The clear paint composition according to claim 1, wherein the main material part and the hardener part are mixed in a weight ratio of 2.0:1 to 4.0:1.

4. The clear paint composition according to claim 1, wherein the epoxy-denatured acrylic resin has an acid value of 3 to 10 mg/KOH, a hydroxyl content of 1 to 5%, and a weight-average molecular weight (Mw) of 8,000 to 20,000.

5. The clear paint composition according to claim 1, wherein the epoxy-denatured acrylic resin is an epoxy-denatured acrylic resin having a repeated unit structure represented by Formula 1 below:

[Formula 1]

wherein K, L, M, N and O are relative ratios of each repeated unit thereof and K+L+M+N+O=1; a repeated methyl methacrylate unit K is 0.2 to 0.6; a repeated epoxy acrylate unit L is 0.1 to 0.25; a repeated methyl acrylate unit M is 0.1 to 0.2; a repeated butyl methacrylate unit N is 0.1 to 0.15; and a repeated 2-hydroxyethyl methacrylate unit O is 0.1 to 0.2.

6. The clear paint composition according to claim 1, wherein the acrylic resin has an acid value of 0.01 to 0.05 mg/KOH, a hydroxyl content of 0.1 to 0.5% and a weight-average molecular weight (Mw) of 9,000 to 15,000.

7. The clear paint composition according to claim 1, wherein the polyester polyol has a hydroxyl content of 2 to 4% and a weight-average molecular weight (Mw) of 3,000 to 10,000.

8. The clear paint composition according to claim 1, wherein the reactive catalyst is dibutyl tin dilaurate.

9. The clear paint composition according to claim 1, wherein the wet additive is a polydimethyl siloxane-based material.

10. The clear paint composition according to claim 1, wherein the light stabilizer is two or more selected from the group consisting of benzophenones, oxanilides, benzotriazoles, triazines, 4-benzoyloxy-2,2,6,6-tetramethylpiperidine and 2,4-di-tert-butylphenyl-3,5-di-tert-butyl-benzoate.

11. The clear paint composition according to claim 1, wherein the solvent is an ester-based material, a hydrocarbon-based material or a mixture thereof.

12. The clear paint composition according to claim 1, wherein the hardener part comprises 90 to 99% by weight of the hexamethylene diisocyanate trimer-based hardener and 1 to 10% by weight of the reactive silicone hardener.

13. The clear paint composition according to claim 1, wherein the reactive silicone hardener comprises 0.1 to 1% by weight of an isocyanate group based on a weight of silicone.

14. A method of painting using a clear paint composition for a hot stamping film, the method comprising:
forming a primer layer by spreading, on a painting subject, a primer paint composition comprising an epoxy-denatured acrylic resin, an acrylic resin, a polyester polyol, a reactive catalyst, a wet additive, a light stabilizer and a solvent; and
forming a clear layer by spreading the clear paint composition according to claim 1 on the primer layer.

15. The method according to claim 14, wherein the primer paint composition comprises 50 to 60% by weight of the epoxy-denatured acrylic resin, 10 to 15% by weight of the acrylic resin, 5 to 10% by weight of polyester polyol, 0.1 to 1.5% by weight of the reactive catalyst, 0.1 to 1% by weight of the wet additive, 1 to 2% by weight of the light stabilizer and 20 to 30% by weight of the solvent.

16. The method according to claim 14, wherein the painting subject is a polymer film formed through hot stamping.

\* \* \* \* \*